United States Patent
Okada et al.

(10) Patent No.: US 8,703,334 B2
(45) Date of Patent: Apr. 22, 2014

(54) AMORPHOUS ELECTRODE ACTIVE MATERIAL AND LITHIUM SECONDARY BATTERY

(75) Inventors: Shigeto Okada, Fukuoka (JP); Jun-ichi Yamaki, Fukuoka (JP); Tetsuya Waseda, Fukuoka (JP); Motoshi Isono, Toyota (JP)

(73) Assignees: Kyushu University, National University Corporation, Fukuoka (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 452 days.

(21) Appl. No.: 12/593,412

(22) PCT Filed: Mar. 28, 2008

(86) PCT No.: PCT/IB2008/001553
§ 371 (c)(1),
(2), (4) Date: Mar. 29, 2010

(87) PCT Pub. No.: WO2008/120106
PCT Pub. Date: Oct. 9, 2008

(65) Prior Publication Data
US 2010/0183923 A1 Jul. 22, 2010

(30) Foreign Application Priority Data
Mar. 30, 2007 (JP) ................................. 2007-094502

(51) Int. Cl.
*H01M 4/13* (2010.01)

(52) U.S. Cl.
USPC .................... 429/221; 429/218.1; 429/231.95

(58) Field of Classification Search
USPC .................. 429/218.1, 231.95, 221
See application file for complete search history.

(56) References Cited

U.S. PATENT DOCUMENTS

| 2004/0086445 A1 * | 5/2004 | Armand et al. ............... 423/306 |
| 2005/0221168 A1 | 10/2005 | Dahn et al. |
| 2006/0127767 A1 * | 6/2006 | Gauthier et al. ............. 429/221 |
| 2006/0194104 A1 * | 8/2006 | Okada et al. ................. 429/221 |

FOREIGN PATENT DOCUMENTS

| CN | 1409432 | 4/2003 |
| CN | 1875507 | 12/2006 |
| EP | 0 634 803 A1 | 1/1995 |
| EP | 1 681 739 A1 | 7/2006 |
| GB | 744947 | 2/1956 |
| JP | 8-78002 | 3/1996 |
| JP | 9-22695 | 1/1997 |
| JP | 10-74515 | 3/1998 |

(Continued)

OTHER PUBLICATIONS

K. Xu et al., "Toward Reliable Values of Electrochemical Stability Limits for Electrolytes", Journal of the Electrochemical Society, vol. 146, No. 11, pp. 4172-4178 (1999).

(Continued)

*Primary Examiner* — Zachary Best
(74) *Attorney, Agent, or Firm* — Finnegan, Henderson, Farabow, Garrett & Dunner, LLP

(57) ABSTRACT

Electrode active material that is used together with an electrolyte solution having an electrolyte decomposition potential Ve is represented by the general expression $Li_xFeM_yO_2$ and is amorphous. In the expression, x and y are values which independently satisfy $1 < x \leq 2.5$ and $0 < y \leq 3$, respectively, and $z=(x+(\text{valence of Fe})+(\text{valence of M}) \times y)/2$ to satisfy stoichiometry, and M represents one or two or more types of glass former element. The average electronegativity of M is less than $(V_e+6.74)/5.41$.

5 Claims, 3 Drawing Sheets

(56) References Cited

FOREIGN PATENT DOCUMENTS

| | | |
|---|---|---|
| JP | 10-134813 | 5/1998 |
| JP | 2002-270171 | 9/2002 |
| JP | 2005-135866 | 5/2005 |
| JP | 2005-158673 | 6/2005 |
| JP | 2005158673 A * | 6/2005 |

OTHER PUBLICATIONS

International Search Report in PCT/IB2008/001553 dated Sep. 1, 2009.

Written Opinion of the International Searching Authority in PCT/IB2008/001553.

Notification of the First Office Action for Chinese Appl. No. 200880010931.2 dated Jul. 13, 2011.

Canadian Office Action for Canadian Appl. No. 2,682,094 dated Mar. 9, 2012.

Notification of Reason(s) for Refusal for JP Appl. No. 2007-094502 dated Sep. 4, 2012.

* cited by examiner

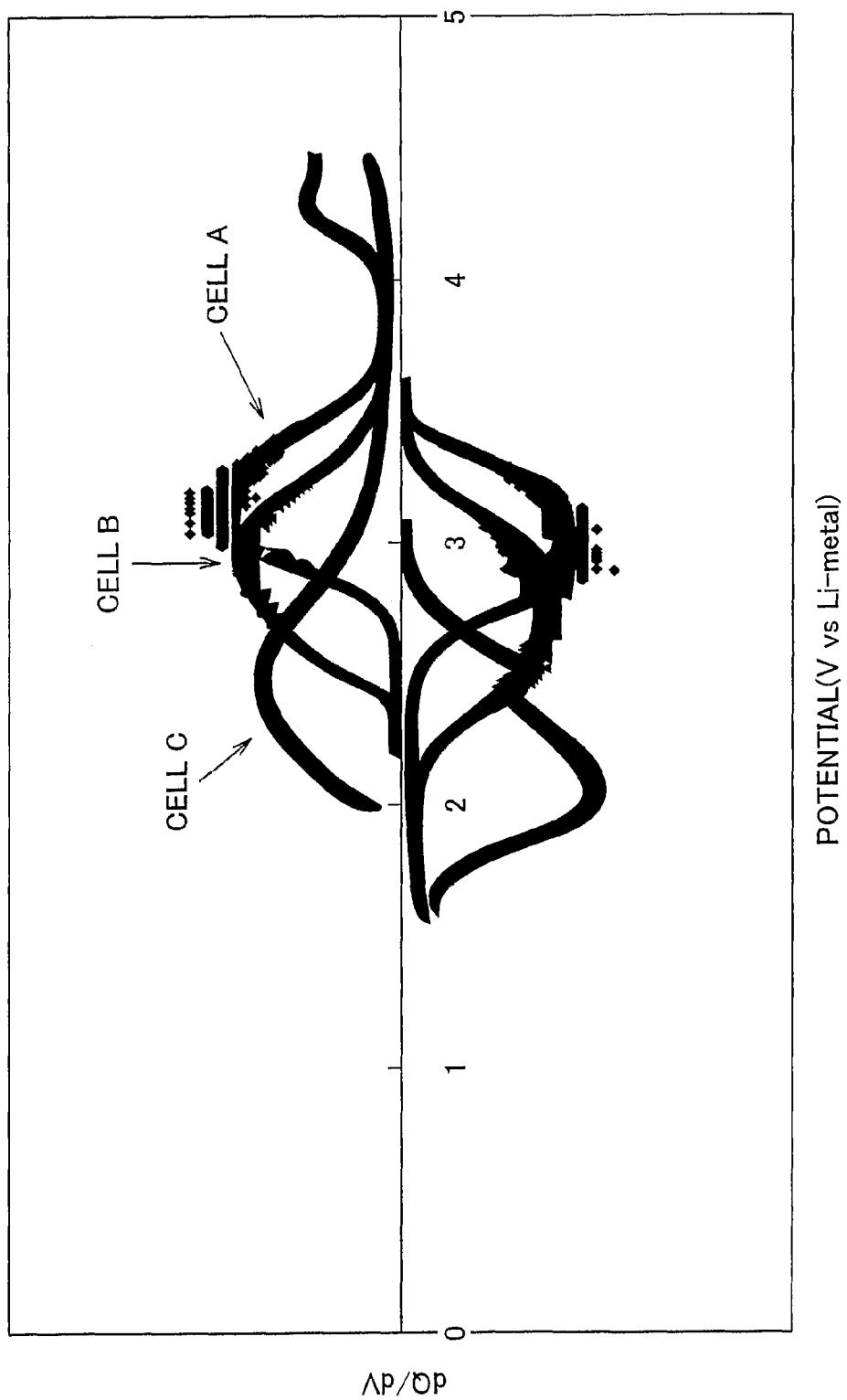

AMORPHOUS ELECTRODE ACTIVE MATERIAL AND LITHIUM SECONDARY BATTERY

CROSS REFERENCE TO RELATED APPLICATIONS

This application is a national phase application based on PCT/IB2008/001553, filed Mar. 28, 2008, which claims the priority of Japanese Patent Application No. 2007-094502, filed Mar. 30, 2007, the contents of which are incorporated herein by reference.

BACKGROUND OF THE INVENTION

1. Field of the Invention

The invention relates to amorphous electrode active material which has superior charging and discharging characteristics, and a lithium secondary battery which uses that amorphous electrode active material.

2. Description of the Related Art

As personal computers, video cameras, mobile phones and other such devices become smaller, lithium secondary batteries have come to be widely used as power sources in the fields of communication and information-related devices due to their high energy density. Also, in the automotive field as well, there is a push for the rapid development of electric vehicles due to environmental and resources issues, and lithium secondary batteries are being considered for use as power sources to power these electric vehicles.

Currently amorphous electrode active material is known to be used as the electrode active material in lithium secondary batteries. For example, Japanese Patent Application Publication No. 2005-135866 (JP-A-2005-135866) describes electrode active material that is mainly an amorphous metal complex represented by the general expression $M_{2-2x}B_{2x}O_3$. Also, Japanese Patent Application Publication No. 8-78002 (JP-A-8-78002) describes positive electrode active material that is made up of an oxide of a transition metal from the 7A family or an oxide of a transition metal from the 8A family or both, in which a portion of that transition metal oxide has an amorphous structure. Further, Japanese Patent Application Publication No. 10-74515 (JP-A-10-74515) describes positive electrode active material in which a transition metal from the 7A family or a transition metal from the 8A family or both is Me, and in which a portion or all that has a $LiMeO_2$ structure is made up of an amorphous metal oxide.

Amorphous electrode active material is advantageous in that the composition can be set freely compared with crystalline electrode active material. Moreover, although amorphous electrode active material shows promise as a high capacity electrode active material, its actual capacity is currently still low so there is a demand for high capacity amorphous electrode active material. Incidentally, Japanese Patent Application Publication No. 10-134813 (JP-A-10-134813) and Japanese Patent Application Publication No. 9-22695 (JP-A-9-22695) both describe electrode active material and the like which, although not amorphous, does consist mainly of an iron complex $FeBO_3$ or the like.

SUMMARY OF THE INVENTION

This invention provides amorphous electrode active material with superior charging and discharging characteristics.

The inventors have found a correlative relationship between the oxidation potential of Fe and the average electronegativity of M in amorphous electrode active material represented by the general expression $Li_xFeM_yO_z$ (where M is a one or two or more types of glass former element). More specifically, the inventors have found that the oxidation potential of Fe drops when the average electronegativity of M decreases, and that not only divalent-trivalent redox (i.e., oxidation-reduction) of Fe, but also trivalent-quadrivalent redox of Fe can be put to practical use. Normally, the oxidation potential from trivalent Fe to quadrivalent Fe is higher than the decomposition potential of the electrolyte solution (hereinafter also referred to as "electrolyte decomposition potential") so if the potential is increased, the electrolyte solution starts to decompose first, thus preventing trivalent-quadrivalent redox from being put to practical use. However, the inventors have found that by controlling the average electronegativity of M, the oxidation potential from trivalent Fe to quadrivalent Fe can be lowered, and as a result, trivalent-quadrivalent redox of Fe can be actively used.

A first aspect of the invention relates to an electrode active material provided with an electrolyte solution having an electrolyte decomposition potential Ve. This electrode active material is amorphous and is represented by a general expression $Li_xFeM_yO_z$, where x and y are values which independently satisfy $1 < x \leq 2.5$ and $0 < y \leq 3$, respectively, and $z=(x+(\text{valence of Fe})+(\text{valence of M})\times y)/2$ to satisfy stoichiometry, M represents one or two or more types of glass former element, and an average electronegativity of M is less than $(Ve+6.74)/5.41$.

According to this first aspect, the oxidation potential from trivalent Fe to quadrivalent Fe can be reduced so that it is lower than the electrolyte decomposition potential by setting the average electronegativity of M taking the electrolyte decomposition potential Ve into account. As a result, trivalent-quadrivalent redox can be used, thus enabling high capacity electrode active material to be obtained.

Also, the average electronegativity of M may be equal to or less than 2.07. This enables a more practical electrode active material to be obtained.

Further, the M may be B (boron). Accordingly, the electronegativity can be kept within an appropriate range such that high capacity electrode active material can be obtained.

A second aspect of the invention relates to a manufacturing method of electrode active material provided with an electrolyte solution having an electrolyte decomposition potential Ve. This manufacturing method includes melt mixing raw material composition that includes raw materials that constitute a general expression $Li_xFeM_yO_z$, and rapidly solidifying from a molten state the raw material composition that was melt mixed. In the expression, x and y are values which independently satisfy $1 < x \leq 2.5$ and $0 < y \leq 3$, respectively, and $z=(x+(\text{valence of Fe})+(\text{valence of M})\times y)/2$ to satisfy stoichiometry, M represents one or two or more types of glass former element, and an average electronegativity of M is less than $(Ve+6.74)/5.41$.

According to the second aspect, the oxidation potential from trivalent Fe to quadrivalent Fe can be reduced so that it is lower than the electrolyte decomposition potential by setting the average electronegativity of M taking the electrolyte decomposition potential Ve into account. As a result, trivalent-quadrivalent redox can be used, thus enabling high capacity electrode active material to be obtained.

A third aspect of the invention relates to a lithium secondary battery that includes a positive electrode layer that includes the electrode active material described above as positive electrode active material, a negative electrode layer that includes negative electrode active material, a separator arranged between the positive electrode layer and the negative electrode layer, and an electrolyte solution having an electrolyte decomposition potential Ve which is impregnated into at least the separator.

According to this third aspect, a high capacity lithium secondary battery can be obtained by combining the foregoing electrode active material with the foregoing electrolyte solution.

According to the invention, amorphous electrode active material with superior charging and discharging characteristics can be obtained such that the capacity of a lithium secondary battery and the like can be increased.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a graph showing the charging and discharging characteristics of test cells according to an example.

DETAILED DESCRIPTION OF THE EMBODIMENTS

Hereinafter, electrode active material and a lithium secondary battery according to the invention will be described in detail.

First the electrode active material according to a first example embodiment of the invention will be described. The electrode active material according to this example embodiment of the invention is electrode active material which is used together with electrolyte solution having an electrolyte decomposition potential Ve. The electrode active material is amorphous and can be represented by the general expression $Li_xFeM_yO_z$, where x and y are values which independently satisfy $1<x\leq2.5$ and $0<y\leq3$, respectively, and z=(x+(valence of Fe)+(valence of M)×y)/2 to satisfy stoichiometry. Also, M represents one or two or more types of glass former element, and the average electronegativity of M is less than (Ve+6.74)/5.41.

According to the example embodiment of the invention, the oxidation potential from trivalent to quadrivalent Fe can be reduced so that it is less than the electrolyte decomposition potential by setting the average electronegativity of M taking the electrolyte decomposition potential Ve into account. As a result, trivalent-quadrivalent redox can be used which enables high capacity electrode active material to be obtained. Furthermore, the electrode active material according to the example embodiment of the invention is amorphous which is advantageous in that it enables the composition of the electrode active material to be set freely. Incidentally, the electrode active material according to the example embodiment of the invention is normally used as positive electrode active material. Also, hereinafter, the electrode active material according to the example embodiment of the invention may be referred to as amorphous electrode active material represented by the general expression $Li_xFeM_yO_z$.

Figure 1A:
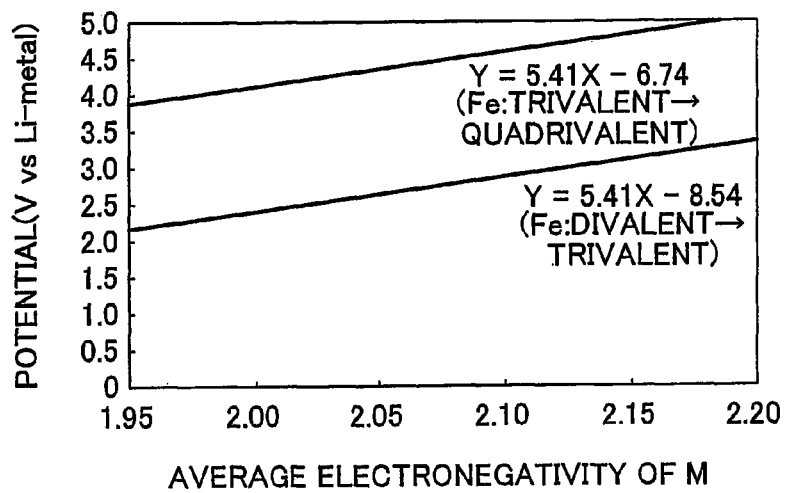
FIGS. 1A and 1B are graphs showing the relationship between the oxidation potential of Fe and the average electronegativity of M in amorphous electrode active material represented by the general expression $Li_xFeM_yO_z$.
Figure 1B:
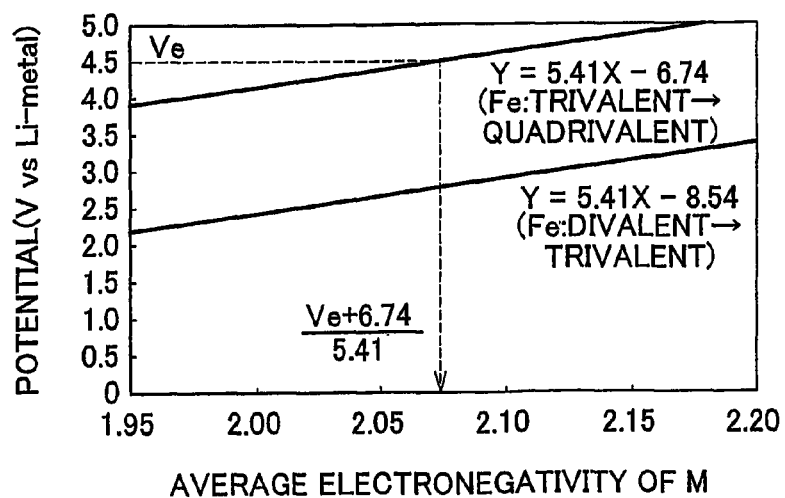

FIGS. 1A and 1B are graphs showing the relationship between the oxidation potential of Fe and the average electronegativity of M in amorphous electrode active material represented by the general expression $Li_xFeM_yO_z$. As shown in FIG. 1A, with amorphous electrode active material represented by the general expression $Li_xFeM_yO_z$, when the x-axis represents the average electronegativity of M and the y-axis represents the potential (V vs Li-metal), the relationship Y=5.41X−6.74 is satisfied for the oxidation potential from trivalent Fe to quadrivalent Fe, and the relationship Y=5.41X−8.54 is satisfied for the oxidation potential from divalent to trivalent Fe.

In the related art, the oxidation potential from trivalent to quadrivalent Fe is higher than the decomposition potential of the electrolyte solution used so the electrolyte solution is first to decompose when the potential is increased. As a result, trivalent-quadrivalent redox was unable to be used. However, in this example embodiment of the invention, as shown in FIG. 1B, when the electrolyte decomposition potential is Ve (V vs Li-metal), the average electronegativity of M is set to correspond to that Ve. More specifically, the average electronegativity of M is made less than (Ve+6.74)/5.41. As a result, the oxidation potential from trivalent to quadrivalent Fe becomes less than the decomposition potential of the electrolyte solution used so trivalent-quadrivalent redox can be used, thus enabling high capacity electrode active material to be obtained. In this manner, the average electronegativity of M in this example embodiment of the invention is defined as being less than (Ve+6.74)/5.41. Hereinafter, the electrode active material according to the example embodiment of the invention will be described divided into the following: i) the structure of the electrode active material, ii) the electrolyte solution used with the electrode active material, and iii) the manufacturing method of the electrode active material.

The electrode active material according to the example embodiment of the invention is amorphous and is represented by the general expression $Li_xFeM_yO_z$, where x and y are values which independently satisfy $1<x\leq2.5$ and $0<y\leq3$, respectively, and z=(x+(valence of Fe)+(valence of M)×y)/2 to satisfy stoichiometry, M represents one or two or more types of glass former element, and the average electronegativity of M is less than (Ve+6.74)/5.41.

In this general expression, the value of x is normally $1<x\leq2.5$, preferably $1.5\leq x\leq2.5$, and more preferably $1.75\leq x\leq2.5$. If the value of x is equal to or less than 1, in theory Fe cannot take on a valence of 4. Conversely, if the value of x is too large, amorphous electrode active material cannot be obtained.

In the foregoing general expression, the value of y is normally $0<y\leq3$, preferably $1.5\leq y\leq3$, and more preferably $1.5\leq y\leq2.5$. If the value of y is too small, amorphous electrode active material cannot be obtained. On the other hand, if the value of y is too large, the capacity becomes smaller such that practical electrode active material cannot be obtained.

In the foregoing general expression, the value of z changes depending on the value of x, the valence of Fe, the valence of M, and the value of y, but it is normally represented by z=(x+(valence of Fe)+(valence of M)×y)/2 to satisfy stoichiometry. That is, in this example embodiment of the invention, the value of z is specified to satisfy electroneutrality. Incidentally, in the example embodiment of the invention, the valence of Fe changes from 2 to 4 with charging and discharging, but when the electrode active material according to this example embodiment of the invention is synthesized using a melt rapid cooling method, which will be described later, for example, the valence of Fe is usually 2 or 3.

In the foregoing general expression, M represents one or two or more types of glass former element. The M is not particularly limited as long as it is an element that forms glass. More specifically, the M may be, for example, boron (B), phosphorus (P), silicon (Si), or tin (Sn). Of these, boron (B) is preferable because the electronegativity is within the appropriate range which enables the capacity of the electrode active material to be high.

In the foregoing general expression, the average electronegativity of M is less than $(Ve+6.74)/5.41$. Incidentally, the electrolyte decomposition potential Ve will be described later in relation to the electrolyte solution that is used together with the electrode active material. The term electronegativity in this example embodiment of the invention refers to Pauling electronegativity. More specifically, boron (B) is 2.04, phosphorus (P) is 2.19, silicon (Si) is 1.90, and tin (Sn) is 1.96. Also, the term average electronegativity in this example embodiment of the invention refers to the weighted average of the electronegativity of each element that constitutes or forms M. For example, when M is formed of boron (B) and phosphorus (P) such that $M=B_{1.5}P_{0.5}$, the average electronegativity is $((2.04\times1.5)+(2.19\times0.5))/(1.5+0.5)=2.08$.

Here, when the average electronegativity of M is equal to $(Ve+6.74)/5.41$, the oxidation potential from trivalent to quadrivalent Fe becomes equal to the decomposition potential of the electrolyte solution so the electrolyte solution ends up decomposing simultaneously with the oxidation of the Fe. Therefore, the average electronegativity of M simply needs to be less than $(Ve+6.74)/5.41$, preferably equal to or less than $((Ve+6.74)/5.41)-0.05$, and more preferably equal to or less than $((Ve+6.74)/5.41)-0.1$ because it enables the high electrode active material to be safer.

Although the range of the average electronegativity of M differs depending on the decomposition potential of the electrolyte solution and the like, it is preferably equal to or less than 2.17, and more preferably equal to or less than 2.07.

One characteristic of the electrode active material according to the example embodiment of the invention is that it is amorphous. This electrode active material is preferably amorphous to the extent that one or two or more of the following conditions are satisfied. (1) the average crystallite size is equal to or less than approximately 1000 Angstrom (preferably equal to or less than approximately 100 Angstrom, and more preferably equal to or less than 50 Angstrom); (2) the specific gravity of the electrode active material is large at equal to or greater than approximately 3% (and more preferably equal to or greater than approximately 5%) compared to the specific gravity (theoretical value) when the electrode active material is completely crystalline; and (3) no peak which supports the electrode active material being crystalline can be observed in an X-ray diffraction pattern. The electrode active material described here is preferably electrode active material that satisfies one or two or more of these conditions (1) to (3). Of these, the electrode active material is preferably an electrode active material that satisfies at least condition (3). Incidentally, the X-ray pattern can be obtained using an X-ray diffractometer (model number: Rigaku RINT 2100 HLR/PC) or the like that may be obtained from Rigaku Corporation, for example. The application effect of this example embodiment of the invention tends to become even greater with electrode active material that is more amorphous (i.e., less crystalline).

Next, electrolyte solution that is used together with the electrode active material will be described. The electrode active material according to the example embodiment of the invention is used together with electrolyte solution having an electrolyte decomposition potential Ve. Incidentally, the unit of the electrolyte decomposition potential Ve is (V vs Limetal), but for the sake of convenience may simply be referred to as V.

The electrolyte decomposition potential Ve differs depending on the composition of the electrolyte solution used, and although not particularly limited, is preferably within the range of 4.00 V to 5.00 V, and more preferably within the range of 4.00 V to 4.50 V, for example. Incidentally, the highest decomposition potential of any practical electrolyte solution currently being used is approximately 4.50 V. However, in this example embodiment of the invention, sufficient effects of the example embodiment of the invention are displayed even if an electrolyte solution having a decomposition potential that exceeds 4.50 V is used. The decomposition potential can be determined by the value listed in a chemical pamphlet or the like or by the measurement results when an actual decomposition experiment is performed on the electrolyte solution.

The electrolyte solution normally contains a supporting salt and a solvent. The supporting salt can be any of a variety of lithium salts such as $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$, for example. The solvent may be any of a variety of types of aprotic solvents such as a carbonate, ester, ether, nitrile, sulfone, or lactone type, or ambient temperature molten salt, for example. Specific examples include propylene carbonate; ethylene carbonate; diethyl carbonate; dimethyl carbonate; ethyl methyl carbonate; 1,2-dimethoxyethane; 1,2-diethoxyethane; acetonitrile; propionitrile; tetrahydrofuran; 2-methyltetrahydrofuran; dioxane; 1,3-dioxolan; nitromethane; N,N-dimethylformamide; dimethylsulfoxide; sulfolane; γ-butyrolactone, and 1-ethyl-3-methylimidazolium tetrafluoroborate ($EMI-BF_4$). In this example embodiment of the invention, only one type or a mixture of two or more types of these solvents may be used.

Next, the manufacturing method of the electrode active material according to a second example embodiment of the invention will be described. The manufacturing method of the electrode active material according to this example embodiment of the invention is not particularly limited as long as it is a method by which the electrode active material described above can be obtained. One example is the melt rapid cooling method. One specific example of the melt rapid cooling method is a method for melt mixing a raw material composition that includes the raw materials which constitute the general expression $Li_xFeM_yO_z$, and rapidly solidifying that raw material composition from a molten state. The raw material composition normally contains Li raw material, Fe raw material, and M raw material.

The Li raw material is not particularly limited as long as it contains a Li element. For example, the Li raw material may be $Li_2O$, LiOH, or $Li_2CO_3$ or the like. Of these, $Li_2O$ is preferable. In this example embodiment of the invention, one or two or more types of the Li raw material may be used. The Fe raw material is not particularly limited as long as it contains an Fe element. For example, the Fe raw material may be FeO or $Fe_2O_3$, FeO being the more preferable. In this example embodiment of the invention, one or two or more types of the Fe raw material may be used.

The M raw material is not particularly limited as long as it includes the glass former element described above. Examples of the M raw material include hydroxide and oxide having the glass former element described above. More specifically, when the glass former element is boron (B), $B_2O_3$ or the like may be used. When the glass former element is phosphorus (P), $P_2O_5$ or the like may be used. When the glass former element is silicon (Si), $SiO_2$ or the like may be used. When the glass former element is tin (Sn), $SnO_2$ or the like may be used. In this example embodiment of the invention, one or two or more types of the M may be used. In this example embodiment of the invention, the type and amount of the M that is used are set so that the average electronegativity of M is less than the value described above.

In this example embodiment of the invention, amorphous electrode active material may be obtained by adjusting the composition of the raw material composition to match the target element ratio, melting that raw material composition at approximately 1200° C., for example, and then rapidly cooling it using a single-roll rapid cooling apparatus provided with a Cu roll.

Next, a lithium secondary battery according to a third example embodiment of the invention will be described. The lithium secondary battery according to the example embodiment of the invention includes a positive electrode layer that includes the foregoing electrode active material as positive electrode active material; a negative electrode layer that includes negative electrode active material; a separator arranged between the positive electrode layer and the negative electrode layer; and an electrolyte solution having an electrolyte decomposition potential Ve which is impregnated into at least the separator.

According to this example embodiment of the invention, a high capacity lithium secondary battery can be obtained by combining the foregoing electrode active material with the foregoing electrolyte solution. That is, as shown in FIG. 1B described above, trivalent-quadrivalent redox of Fe can be used by setting the value of the average electronegativity of M in amorphous electrode active material represented by the general expression $Li_xFeM_yO_z$ according to the electrolyte decomposition potential Ve. The ability to utilize this trivalent-quadrivalent redox of Fe enables a high capacity lithium secondary battery to be obtained.

The electrode active material and the electrolyte solution used in this example embodiment of the invention are the same as the electrode active material and the electrolyte solution in the first example embodiment of the invention so descriptions thereof will be omitted here. Also, the structure of the lithium secondary battery according to this example embodiment of the invention is not particularly limited and may be set as deemed appropriate as long as it at least has the foregoing electrode active material and the foregoing electrolyte solution.

The positive electrode layer normally includes a conductive agent and a binder in addition to the positive electrode active material. The conductive agent may be, for example, carbon black or acetylene black. The binder may be, for example, polyvinylidene-fluoride (PVDF) or polytetrafluoroethylene (PTFE). Also, the lithium secondary battery according to this example embodiment of the invention may also have a positive electrode collector that collects power from the positive electrode layer. The material of this positive electrode collector may be, for example, stainless steel, nickel, aluminum, iron, or titanium.

The negative electrode layer normally includes negative electrode active material, a conductive agent, and a binder. The negative electrode active material is not particularly limited as long as it can store and release lithium ions. Examples include metal lithium, a lithium alloy, metal oxide, metal sulfide, metal nitride, and carbon material such as graphite. Of these, metal lithium is preferable. The conductive agent and the binder can be the same as those used with the positive electrode layer described above. Also, the lithium secondary battery according to this example embodiment of the invention may have a negative electrode collector that collects power from the negative electrode layer. The material of the negative electrode collector may be, for example, copper, stainless steel or nickel.

The separator is not particularly limited as long as it functions to separate the positive electrode layer from the negative electrode layer and hold the electrolyte solution. Possible examples include a porous membrane such as polyethylene or polypropylene, and nonwoven fabric such as resin nonwoven fabric or glass fiber nonwoven fabric. Also, the lithium secondary battery obtained from the example embodiment of the invention may be any of a variety of shapes, such as coin-shaped, laminated (stacked), or cylindrical.

Incidentally, the invention is not limited to the foregoing example embodiments. The foregoing example embodiments illustrate examples. Other examples having substantially the same structure as the technical ideas described within the scope of the claims for patent of the invention and displaying the same operation and effects are also included within the technical scope of the invention.

Hereinafter, the invention will be described in even more detail with the following examples. LiOH as the Li raw material, FeO as the Fe raw material, $P_2O_5$ as the P raw material, and $B_2O_3$ as the B raw material were prepared. Using these raw materials, raw material components A to C were then obtained by mixing the constituent components together so that the molar ratio was the same as that shown in Chart 1 below.

CHART 1

|  | Li:Fe:P:B |
| --- | --- |
| Raw material composition A | 2:1:1.5:0 |
| Raw material composition B | 2:1:1:1 |
| Raw material composition C | 2:1:0:2 |

Next, the raw material components were melted for 1 minute at 1200° C. in an Ar atmosphere and then rapidly cooled with a single-roll rapid cooling apparatus provided with a Cu roll to obtain electrode active materials A to C. The crystallinity of each of the obtained electrode active materials A to C was then evaluated using X-ray diffraction under the following measurement conditions: Apparatus used: Rigaku, RAD-X; X-ray: CuKα, 40 kV, 40 mA; scan range: 2θ=10° to 80°. In the results, no peak which supports crystallinity could be observed in an X-ray diffraction pattern for any of the electrode active materials A to C so the electrode active materials A to C were all confirmed to be amorphous.

Next, test cells were manufactured using the electrode active materials A to C and the charging and discharging characteristics of each cell were evaluated. First, 0.4 grams of electrode active material A was weighed out and added to a zirconia mill pot. Ball mill processing was then performed for 3 hours at 300 rpm. Next, 0.1429 grams of acetylene black was added and ball mill processing was performed for another 3 hours at 300 rpm. Then 0.053 grams of PTFE was added to the obtained powder and this mixture was then applied to SUS mesh to obtain a positive electrode.

Next, metal lithium as the counter electrode and a polyethylene separator (Ube Industries, Ltd.) were prepared. Also, the electrolyte solution was prepared by dissolving 1 mol/L of $LiPF_6$ as a supporting salt in a mixed solvent having a volume ratio of 3:7 of ethylene carbonate (EC) and diethyl carbonate (DEC). Test cell A which is a 2032 type coin cell was obtained using these materials. Then test cells B and C were obtained in the same way except for that electrode active materials B and C, respectively, were used instead of electrode active material A.

Next, charging and discharging using the test cells A to C obtained as described above were performed under the following conditions: Charging: 4.5 V, CC157 μA, Rest: 5 min, Discharging: 1.5 V, CC157 μA, Rest: 5 min.

FIG. 2 is a graph in which the obtained charging and discharging curves have been converted into differential capacity. As is evident from FIG. 2, divalent-trivalent redox of Fe was confirmed in test cells A and B, though trivalent-quadrivalent redox of Fe was not. On the other hand, in test cell C, an oxidation potential of trivalent-quadrivalent Fe near 4.3 V, as well as an oxidation potential of divalent-trivalent Fe near 2.5 V was observed.

A compilation of the results of FIG. 2 are shown in Chart 2 below.

CHART 2

| | Electrode active material composition * | Average electronegativity of M | Oxidation potential (V) of Fe (divalent → trivalent | Oxidation potential (V) of Fe (trivalent → quadrivalent |
|---|---|---|---|---|
| Test cell A | $Li_2FeP_{1.5}O_z$ | 2.19 | 3.30 | Not observed |
| Test cell B | $Li_2FeP_1B_1O_z$ | 2.12 | 2.96 | Not observed |
| Test cell C | $Li_2FeB_2O_z$ | 2.04 | 2.49 | 4.29 |

* In the expressions, z is a number that satisfies electroneutrality.

Figure 3:
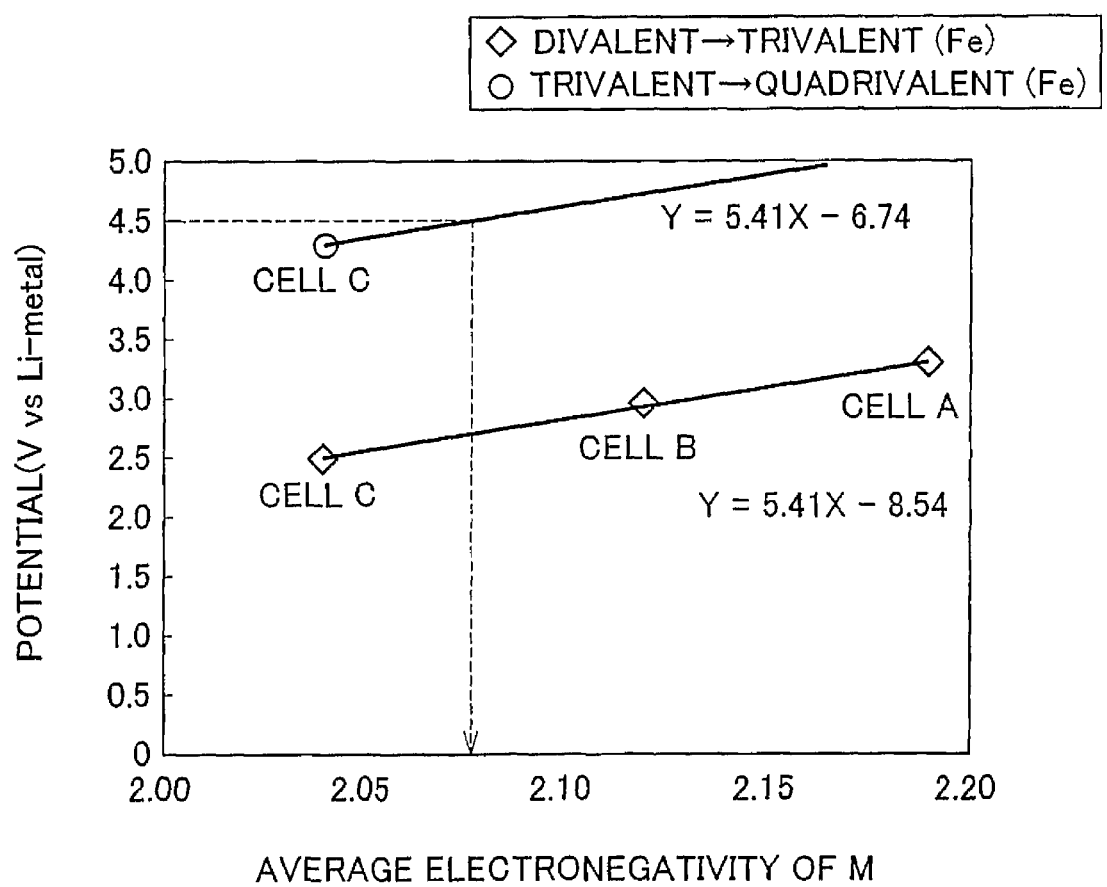
FIG. 3 is a graph showing the relationship between the oxidation potential of Fe and the average electronegativity of M in amorphous electrode active material according to the example.

FIG. 3 is a graph in which the x-axis represents the average electronegativity of M and the y-axis represents the oxidation potential. As is evident from FIG. 3, it was confirmed that when the average electronegativity of M decreases, the oxidation potential from divalent to trivalent Fe also decreases. Incidentally, in FIG. 3, the straight line of the oxidation potential from divalent to trivalent Fe and the straight line of the oxidation potential from trivalent to quadrivalent Fe are parallel. This is because the redox potential is determined by the relationship between an inherent potential that an Fe valence change has and an electronegativity that an element (Li, M, O) around the Fe has. Furthermore, taking into consideration that the decomposition voltage of the electrolyte solution used in this example is 4.50 V, the average electronegativity of M must be equal to or less than 2.07 to realize trivalent-quadrivalent redox of Fe. The average electronegativity of M in both test cells A and B is higher than approximately 2.07 so in actuality test cells A and B were unable to utilize trivalent-quadrivalent redox. The average electronegativity of M in test cell C, however, is lower than approximately 2.07 so test cell C was able to utilize trivalent-quadrivalent redox.

The invention claimed is:

1. Electrode active material provided with an electrolyte solution having an electrolyte decomposition potential Ve, for a battery or electrochemical cell, wherein
the electrode active material is amorphous; and
the electrode active material is represented by a general expression $Li_xFeM_yO_z$, wherein in the expression, x and y are values which independently satisfy 1.5≤x≤2.5 and 1.5≤y≤2.5, respectively, and z=(x+(valence of Fe)+(valence of M)×y)/2 to satisfy stoichiometry, M is B or Sn, and an average electronegativity of M is less than (Ve+6.74)/5.41, Ve ranging from 4.0 V to 5.0 V.

2. The electrode active material according to claim 1, wherein the average electronegativity of M is equal to or less than 2.07.

3. The electrode active material according to claim 1, wherein the M is boron.

4. A manufacturing method of electrode active material provided with an electrolyte solution having an electrolyte decomposition potential Ve, for a battery or electrochemical cell, comprising:
melt mixing raw material composition that includes raw materials that constitute a general expression $Li_xFeM_yO_z$; and
rapidly solidifying from a molten state the raw material composition that was melt mixed,
wherein in the expression, x and y are values which independently satisfy 1.5≤x≤2.5 and 1.5≤y≤2.5, respectively, and z=(x+(valence of Fe)+(valence of M)×y)/2 to satisfy stoichiometry, M is B or Sn, and an average electronegativity of M is less than (Ve+6.74)/5.41, Ve ranging from 4.0 V to 5.0 V.

5. A lithium secondary battery comprising:
a positive electrode layer that includes the electrode active material according to claim 1 as positive electrode active material;
a negative electrode layer that includes negative electrode active material;
a separator arranged between the positive electrode layer and the negative electrode layer; and
an electrolyte solution having an electrolyte decomposition potential Ve which is impregnated into at least the separator.

* * * * *